Feb. 22, 1955

R. E. DIVETTE 2,702,482

PROTECTIVE APPARATUS

Filed May 17, 1951

INVENTOR.
RANDOLPH E. DIVETTE
BY
George H Fisher
ATTORNEY.

FIG. 2

INVENTOR.
RANDOLPH E. DIVETTE
BY
George H Fisher
ATTORNEY.

Feb. 22, 1955  R. E. DIVETTE  2,702,482
PROTECTIVE APPARATUS
Filed May 17, 1951  7 Sheets-Sheet 4

FIG. 4

INVENTOR.
RANDOLPH E. DIVETTE
BY
*George H. Fisher*
ATTORNEY

Feb. 22, 1955

R. E. DIVETTE 2,702,482

PROTECTIVE APPARATUS

Filed May 17, 1951

FIG. 5
OPEN GATE POSITION

FIG. 6
MID POSITION

FIG. 7
CLOSED GATE POSITION

FIG. 8
COLLAPSED POSITION

INVENTOR.
RANDOLPH E. DIVETTE
BY
George H Fisher
ATTORNEY.

INVENTOR.
RANDOLPH E. DIVETTE
BY
*George H Fisher*
ATTORNEY

Feb. 22, 1955　　　R. E. DIVETTE　　　2,702,482
PROTECTIVE APPARATUS
Filed May 17, 1951　　　　　　　　　　　　　7 Sheets-Sheet 7

INVENTOR.
RANDOLPH E. DIVETTE
BY
*George H Fisher*
ATTORNEY

United States Patent Office 2,702,482
Patented Feb. 22, 1955

2,702,482
PROTECTIVE APPARATUS

Randolph E. Divette, Minnetonka Township, Hennepin County, Minn., assignor to Minneapolis-Honeywell Regulator Company, Minneapolis, Minn., a corporation of Delaware Application May 17, 1951, Serial No. 226,903

14 Claims. (Cl. 74—2)

The present invention is concerned with an improved protective apparatus wherein it is desirable to disrupt a driving connection between a driving member and a driven member and to move the driven member to a predetermined fixed position. More specifically, the present invention is concerned with a protective apparatus for establishing a driving connection between a waste gate motor in a turbosupercharger system and a waste gate wherein the connection will be disrupted upon the occurrence of a condition which requires limiting.

Many types of high powered combustion engines are provided with turbosuperchargers for supplying air at high pressures to the engines so that maximum power may be obtained therefrom. The driving energy for the superchargers is often obtained from the flow of exhaust gases from the engine. To control the operation of the turbines, of such superchargers, a waste gate is often provided which may be used to divert the flow of the gases around the turbine. This waste gate may be controlled by any suitable control apparatus which may be of the type shown in Letters Patent of Alex B. Chudyk, entitled "Pressure Control Apparatus Having Limiting Controller," #2,629,074, issued February 17, 1953.

As excessive pressures on the engine intake may cause damage to the engine, it is necessary to provide some protective apparatus to insure that the pressure is limited to a predetermined safe value. An apparatus for protecting the apparatus against excessive pressures is shown in a Udale Patent 2,313,283, for "Power Control," issued March 9, 1943. The Udale apparatus provides a system wherein a pair of connecting links between a throttle and a throttle adjusting lever may be moved to an inoperative position and the throttle closed upon the occurrence of an excessive manifold pressure. The Udale apparatus, however, is not readily adapted to use with a waste gate wherein the resetting of the apparatus when tripped must be done by remotely operated means and wherein adjustment of the apparatus to determine the tripped position can be readily made. Further, the Udale apparatus is not readily adapted for mounting in a small space to still accomplish the function desired. Still further, it is desirable to separate the tripping function of the apparatus from the electrical system to prevent momentary power failures from affecting operation of the apparatus when not needed.

It is therefore an object of the present invention to provide a new and improved protective apparatus wherein a coupling between a driven member and a driving member is interrupted.

Another object of the present invention is to provide an improved protective apparatus wherein a collapsible linkage is connected between a driven member and a driving member.

Still another object of the present invention is to provide an improved collapsible connecting linkage between a driven member and a driving member wherein a maximum collapsing force may be applied to the linkage and the linkage may be reset with a minimum of force.

A further object is to provide a connecting linkage between a driven member and a driving member which is in the form of a parallelogram having one of the members forming one side of the linkage and being supported by a movable support on the side opposite the one member.

These and other objects of the present invention will be understood upon considering the following specification and drawings of which.

Figure 1:
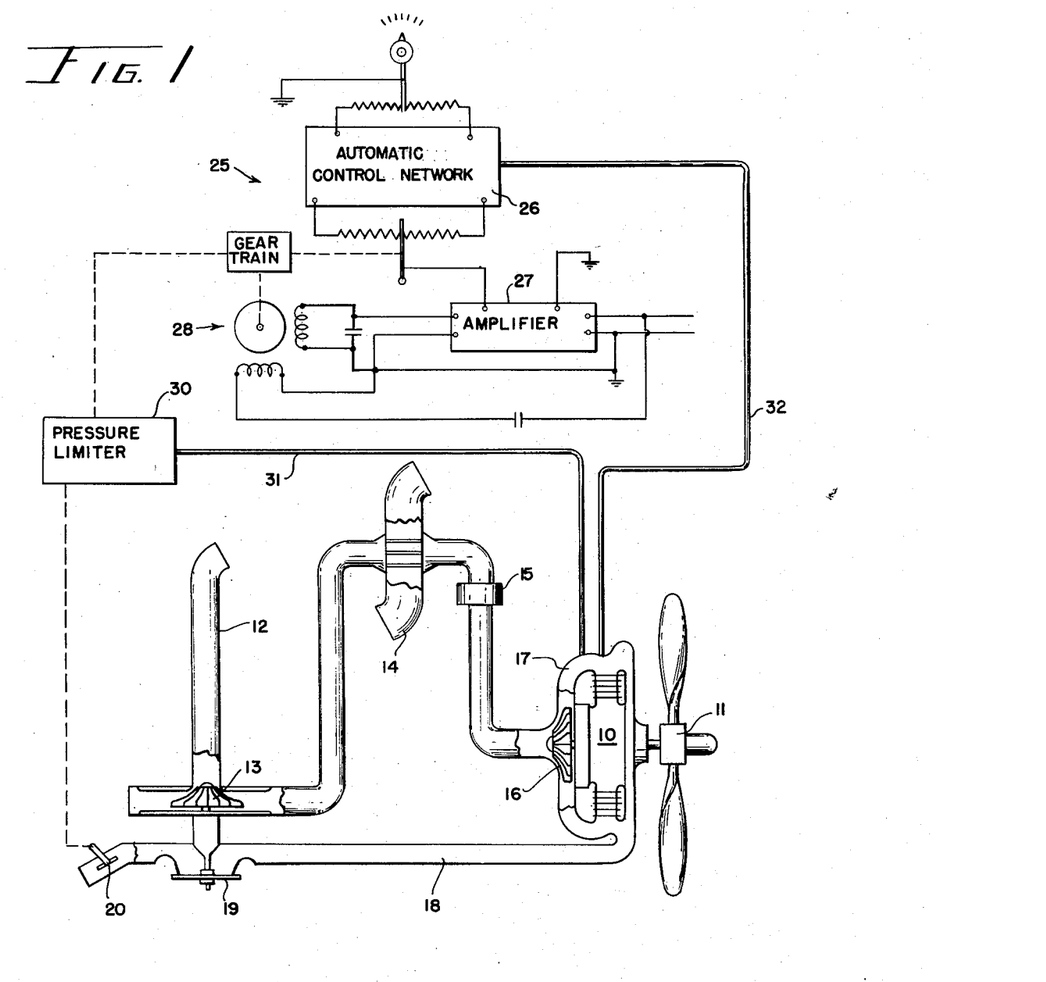
Figure 1 is a diagrammatic showing of a turbosupercharger control system of an internal combustion engine with the present invention shown in its normal connection into the system.

Referring first to Figure 1, the numeral 10 represents a combustion engine which is shown to be driving a propeller 11. Air for the intake of the engine is supplied through an intake conduit 12 where the same is drawn by a compressor 13. The compressor 13 forces the air under pressure through an inter cooler 14 and a carburetor 15 to a direct driven compressor 16 which is arranged to be driven by the engine 10. The compressor 16 further compresses the air and the same is supplied to the intake manifold 17 of the engine 10.

The products of combustion or the exhaust gases from the engine 10 are fed through a conduit 18 to a turbine 19 which is connected in driving relation to the compressor 13. The exhaust gases from the exhaust conduit 18 expanding through the turbine 19 drive the same and in turn drive the compressor 13. Controlling of the flow of gases through the turbine is by a waste gate 20, the gate when in the open position bypassing the gases around the turbine 19 and when in the closed position causing all of the gases to flow through the turbine 19 to thus vary the speed of the turbine 19 when moved between the two positions.

The controlling of the position at the waste gate 20 is accomplished by an automatic controlling apparatus indicated generally by the numeral 25. This control apparatus includes an automatic control network 26 of the balanceable electric type, and a balancing detecting device in the form of an amplifier 27, and a motor 28 which is adapted to be reversibly driven by the amplifier 27. The output of the motor 28 is fed through a pressure limiter 30 to the waste gate 20. The pressure sensed by the pressure limiter is fed from the intake manifold 17 through a conduit 31 while the pressure sensed by the automatic control network is fed thereto through a conduit 32.

For a complete understanding of the automatic control apparatus of Figure 1, reference should be made to the above mentioned Alex B. Chudyk Patent #2,629,074. For purposes of explanation here, it should be understood that unbalance signals appearing in the network 26 due to a change in manifold pressure or due to a manual adjustment of the network will be detected by the amplifier 27. Amplifier 27 will be, in turn, controlling the operation of the waste gate motor 28 and causing rotation thereof in one direction or the other depending upon the direction of unbalance of the network 26. The motor 28 operating through the pressure limiter will open or close the waste gate to decrease or increase the speed of the turbine 19 and the compressing effect of the compressor 13 in order to cause the intake manifold pressure to assume a desired value. In the event the intake manifold pressure is higher than a predetermined safe value, it is desired that the pressure limiter 30 be effective to break the driving connection between the motor 28 and the waste gate 20 and to move the waste gate 20 to a predetermined safe position such that the pressure in the intake manifold will be reduced to a safe value.

Figure 2:
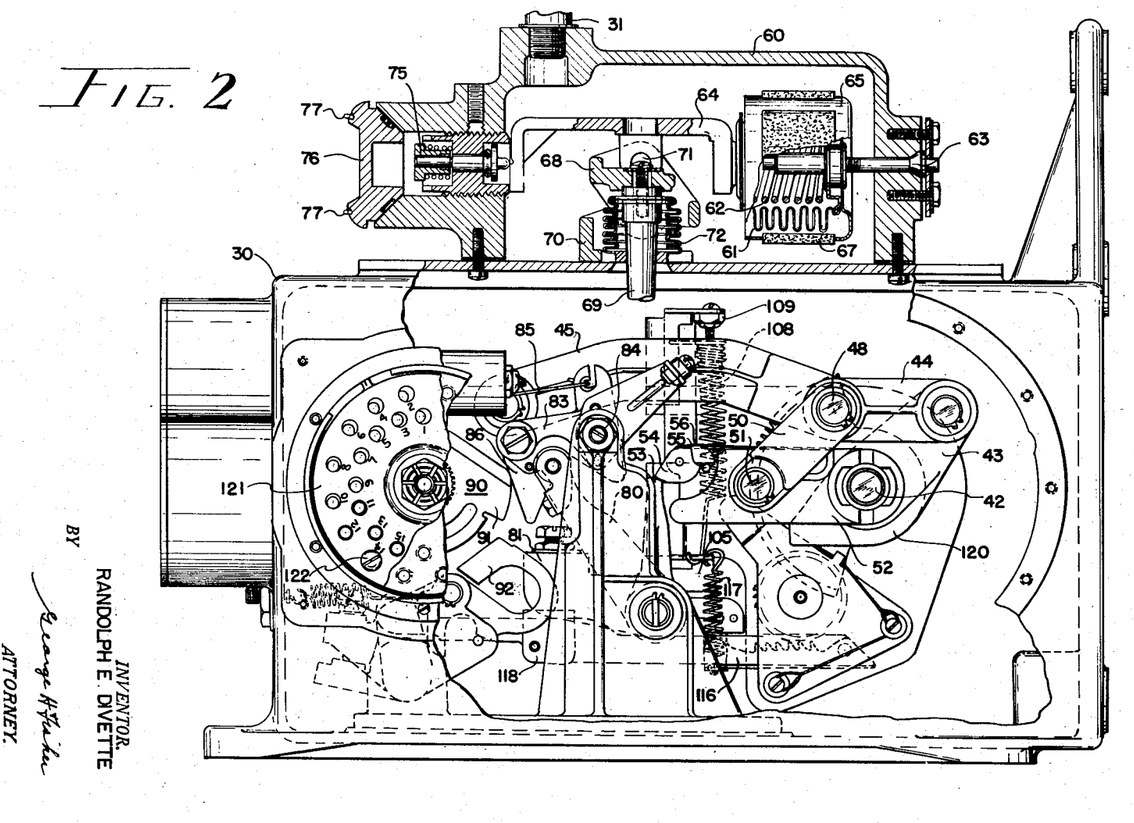
Figure 2 is a side view of one form of the invention with portions thereof cut away to show the linkage mechanism.
Figure 3:
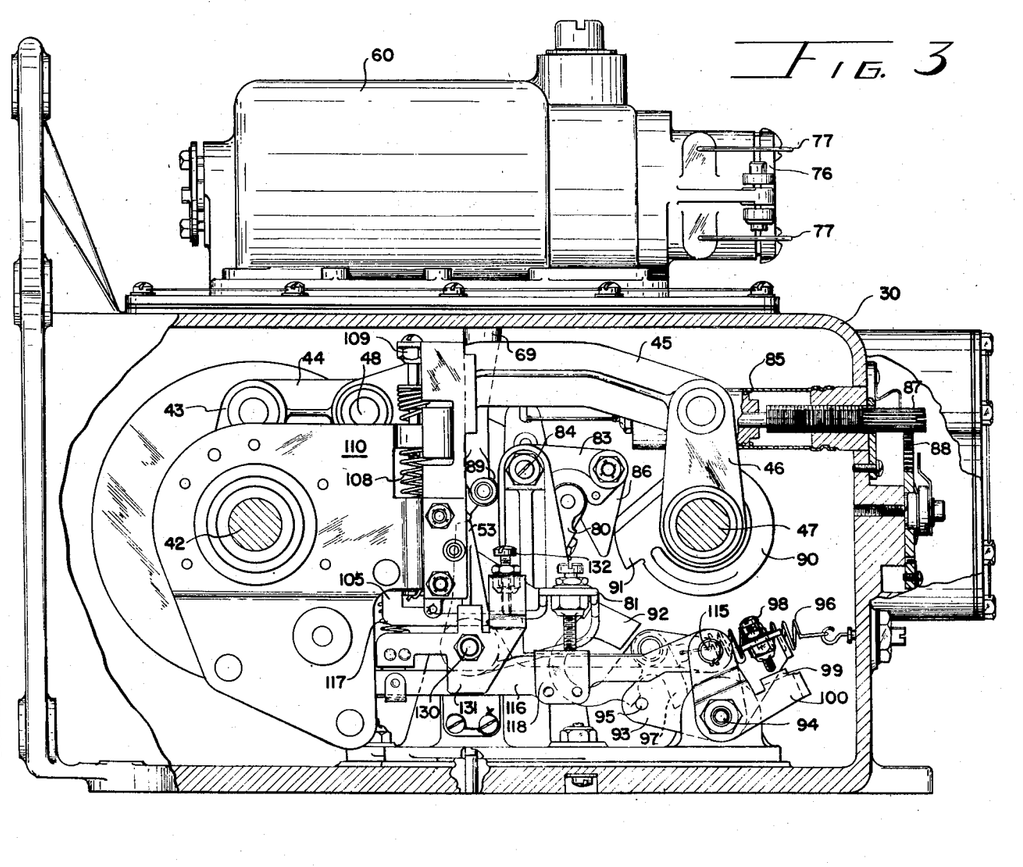
Figure 3 is a view taken from the side opposite that of Figure 2.
Figure 4:
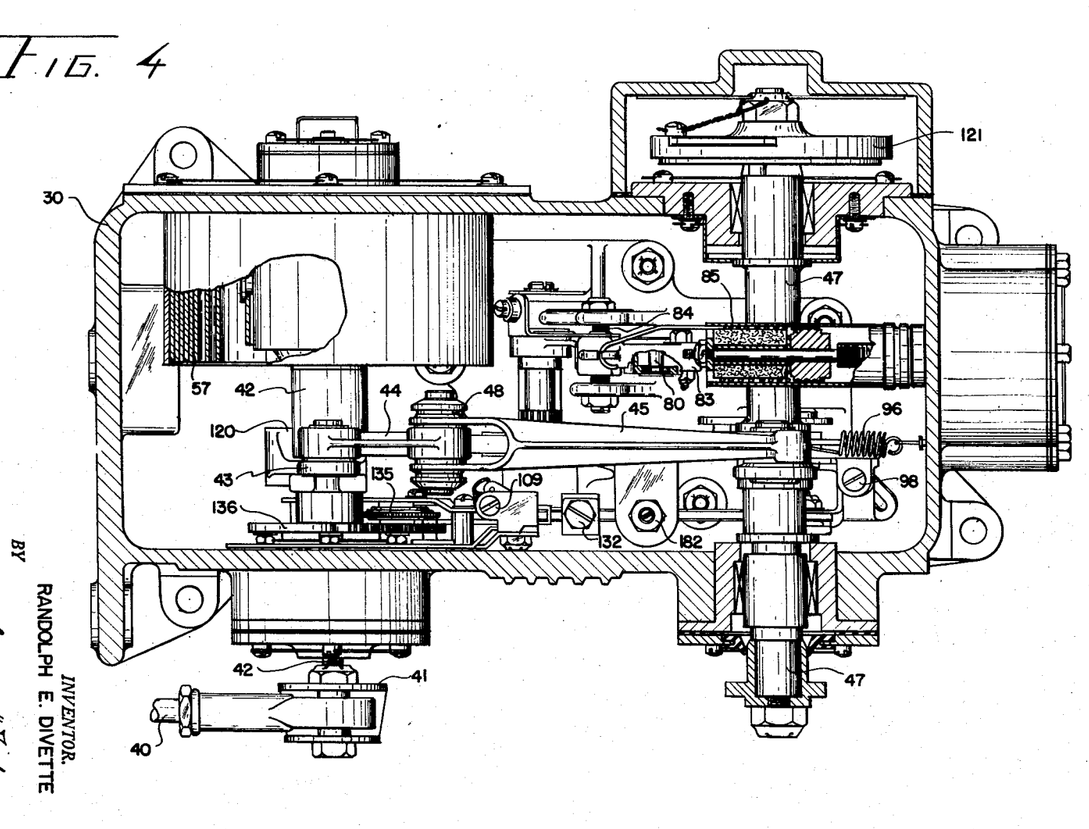
Figure 4 is a top view of the linkage apparatus with the pressure responsive control shown in Figures 2 and 3 removed.

Referring now to Figures 2, 3 and 4, the pressure limiting apparatus 30 is shown with portions of the housing removed. A driving connection is established through a link 40, shown in Figure 4, said link connecting through a bell crank 41 which is attached to a driving shaft 42, the latter shown in Figures 2 and 3. Within the apparatus is an input driving arm 43 which is rigidly attached to the shaft 42. Pivotally connected to the other end of the driving arm 43 is an input arm link 44. This link 44 also connects to an output arm link 45 by a pivoting means 48. Link 45 is connected to an output arm or driven arm 46 which is rigidly attached to the output shaft 47 and which is normally connected by means of a lever arm, not shown, to the waste gate 20, of Figure 1.

Supporting the pivot 48 and maintaining this pivot in axial alignment with the ends of the links 44 and 45 is a torque arm link 50 which is pivoted at 48 and is also pivoted at 51 on a torque arm 52. This torque arm 52 is pivotally mounted on the input shaft 42 and is rigidly held in position by a latch 53 which engages a torque arm nose member 54, the latter of which is pivotally mounted on the end of the torque arm 52 and is biased against a pin 55 by a blade type spring 56. The torque arm 52 is biased against the latch 53 by a torque spring 57, shown in Figure 4, which is of the spiral type and is movable about the input shaft 42.

Figure 5:
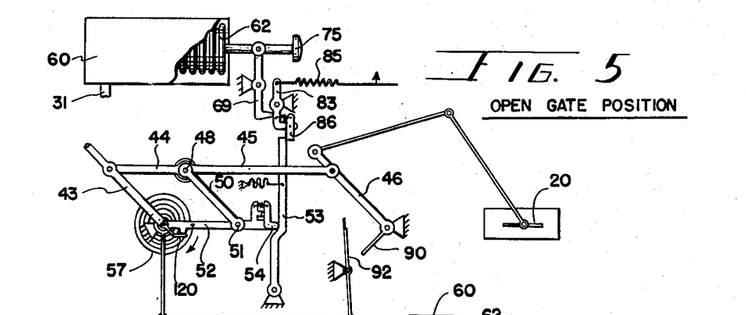
Figures 5, 6, 7 and 8 show schematically the outline of the linkage system in various positions of operation.
Figures 6, 7:
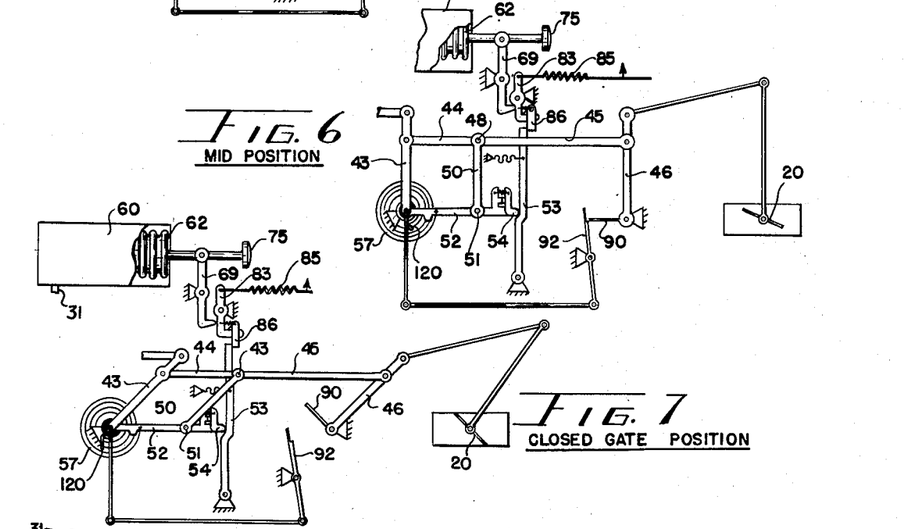

Under normal operation, the apparatus set forth thus far forms an operative driving connection between the input shaft 42 and the output shaft 47. Referring to Figures 5, 6 and 7, the schematic showing of the parts in the various modes of operation will facilitate an understanding of the apparatus set forth thus far. In these figures, the parts corresponding to those of Figures 2, 3 and 4 carry the same reference numerals. It should also be noted that instead of operating through the input shafts and output shafts as shown in the basic figures, the driving connections to the input arm 43 is shown to be direct as is the output connection from output arm 46 to the waste gate 20.

Figure 5 shows the apparatus in the open waste gate position, that is the position in which the exhaust gases will be bypassed around the turbine 19 in Figure 1. It will be noted that the arms 43 and 52 with the links 44 and 50 form a parallelogram and since the respective pivot points are in alignment with those of the output arm 46, the ratio of movement of the input arm with respect to the output arm will be 1 to 1. Figure 5 also shows how the torque spring 57 acts upon the torque arm 52 to bias the same through the nose member 54 against the latch member 53. As the torque spring acts only on the torque arm 52, the spring will not interfere with the positioning of the other members of the apparatus. Thus, when the apparatus is moved to the mid-position as shown upon Figure 6, the input arm 43 and the output arm 46 will rotate in a clockwise direction as shown upon the figure as will the connecting link 50. This clockwise movement of the arms 43 and 46 will cause a corresponding adjustment of the waste gate 20 continued clockwise rotation of the input arm 43 will cause a corresponding rotation of the output arm 46 and when moved far enough the waste gate will be moved to the closed position as is shown in Figure 7. It will thus be seen that in Figures 5, 6 and 7 that when the apparatus is in the latched up position, as is shown in these figures, movement of the input arm 43 will cause a corresponding movement of the output arm and, as far as the waste gate is concerned, the input arm is directly connected to the waste gate.

Figures 10, 11:
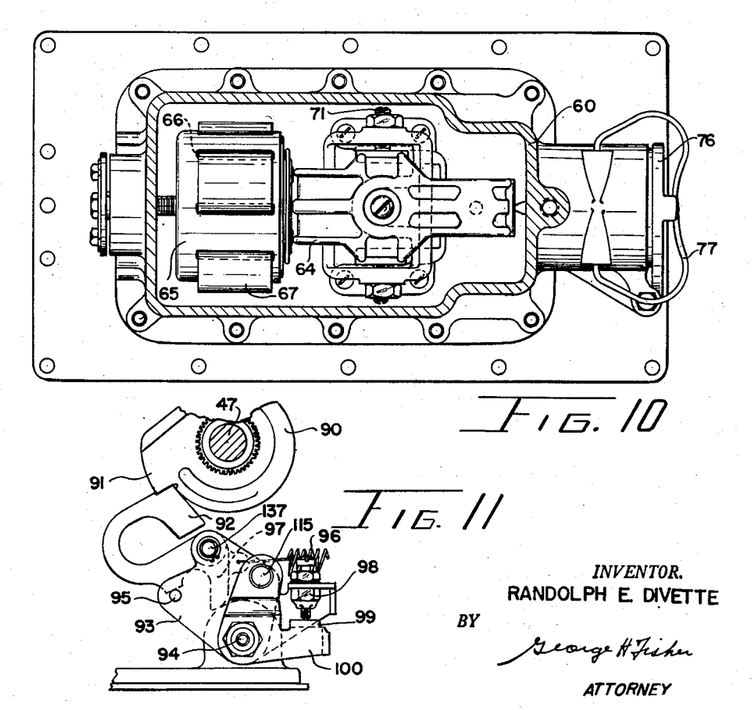
Figure 10 shows a top view of the pressure responsive portion of the apparatus and the manual trip portion of the apparatus.
Figure 11 shows a mechanism for locking the output arm of the apparatus in a predetermined position.

Considering next the pressure responsive portion of the apparatus, reference should be made to Figure 2 where the apparatus is shown in side view and to Figure 10 where the apparatus is shown viewed from the top. A housing 60 surrounds the pressure sensing apparatus and forms a sealed chamber with air supplied thereto through the intake conduit 31 from the intake manifold 17, shown in Figure 1. Inside the housing 60 is a pressure responsive bellows 61 which is evacuated and has a biasing spring 62 mounted therein, said bellows responding to absolute pressure. The right end of the bellows, as shown in Figure 2, is carried by an adjustable screw 63 and the left end is operatively connected to a connecting member 64 which is arranged for movement along the central axis of the bellows 61. The bellows 61 is surrounded by a cup-shaped cover member 65 which has a plurality of slots 66 cut longitudinally in the sides thereof. Threaded through these slots is a felt padding 67 which serves to prevent lateral displacement of the bellows 61 and to protect the bellows from damage which might result from vibrating tendencies of the bellows and the resultant striking of the bellows on the side of the cover member 65.

The connecting member 64 is pivotally connected to a trip arm carrier 68, the latter of which has a trip arm 69 rigidly attached thereto. The carrier 68 is pivotally mounted on a member 70 and is pivoted with respect to member 64 at 71 so that axial movement of connecting member 64 will cause a rotational movement of the carrier member 68 and the trip arm 69. A seal-off bellows 72 separates the interior of housing 60 from that of housing 30.

A manual actuator for connecting member 64 is indicated at 75, this actuator being located under a removable sealing cap 76, the latter of which is held in position by a pair of spring clamps 77. When there is an increase in the pressure in the housing 60, the bellows 61 will collapse and move to the right, as viewed in Figure 2, and this will result in clockwise movement of the trip arm 69.

Figure 9:
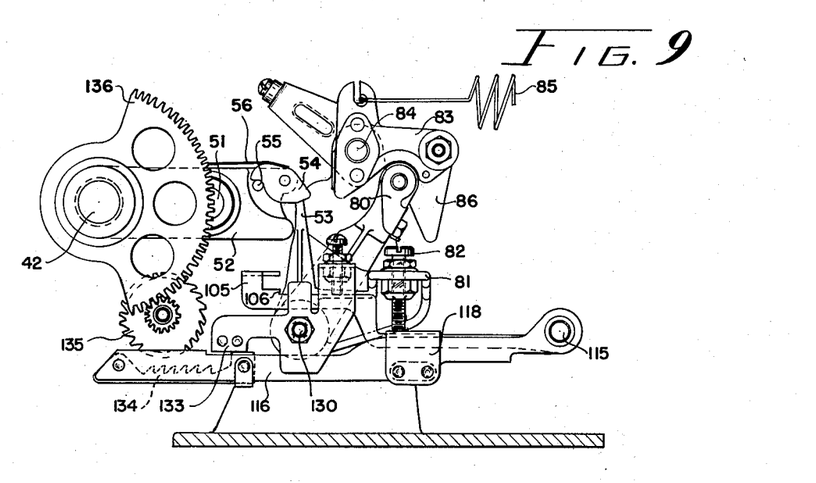
Figure 9 shows a section of the tripping mechanism of the apparatus.

Considering next the latch 53 and the releasing mechanism therefore, reference should be made to Figures 2, 3 and 9. The latch 53 is one part of a single member which includes a latch holding arm 80 and a trip actuator 81. The trip actuator 81 has an adjustable screw 82 carried thereby which operates in a manner to be explained hereinafter. The latch holding arm 80 is held in position by a latch crank 83, the latter of which is pivotally mounted at 84 and is biased by means of an adjustable spring 85 so that the latch crank 83 with a cooperating pawl 86 holds the holding arm 80 in the position shown upon the drawing, or in the latched up position. The spring 85 is adjustable by a threaded adjustor 87 which is effective to change the tension of the spring upon the latch crank as well as rotating an indicator 88 as adjustment is made. The torque arm 52 will be biased by the torque spring 57 against the latch 53 and will stay in this position until the latch is tripped.

The tripping of the apparatus is initiated by the trip arm 69 which has a roller surface 89 which bears against the latch crank 83. The latch crank 83, when the trip arm 69 pushes thereagainst with sufficient force, will rotate and will release the latch holding arm 80, the latter having a roller surface on the end thereof. When the latch holding arm 80 is released, the force of the torque arm 52 bearing down through the nose member 54 upon the latch 53 tends to cause rotation of the latch 53 as well as the holding arm 80 and the trip actuator 81. Upon the release of the latch 53 from the position shown upon the drawings, the torque arm will begin to move to a collapsed position, or in a clockwise direction, as shown in Figure 9, or in a counterclockwise direction as shown in Figure 2.

To consider further the operation explained thus far in connection with the initial tripping of the apparatus, reference should be made to Figure 6 where the apparatus is diagrammatically shown in the midposition. Assuming that the pressure within the housing 60 is built up to a sufficient value to cause a collapsing of the bellows 62, the trip arm 69 will be rotated in a counterclockwise direction and will operate upon the latch crank 83 in opposition to the biasing spring 85 and move the pawl 86 away from the end of the latch member 53, the end in effect corresponding to the latch arm 80. When the latch crank 83 rotates in a counterclockwise direction, the latch 53 will be free to move in the clockwise direction due to the force of the torque arm 52 which has the torque spring 57 acting thereon. When the latch 53 moves out from under the nose member 54, the torque arm 52 will be free to move in a clockwise direction and through the torque arm link 50 will cause a breaking torque on the pivot point 48 between the connecting links 44 and 45. The initial breaking force due to this torque arm moving in this direction will present a nearly infinite force because of the fact that the force is acting at right angles upon the connecting links 44 and 45. The torque arm 52 will continue to rotate in a clockwise direction, as shown in Figure 6, until a limiting position has been reached in the apparatus. This limiting position and the manner in which it is reached will be next described.

The apparatus for determining the fixed position upon collapse is shown best in Figures 3, 9, 11, 12 and 13. Rigidly attached to the output arm 46 is a cam stop 90, shown in Figures 3 and 11. This cam stop 90 has a projection 91 extending from the surface thereof with an engaging surface facing in a counterclockwise direction, as viewed in Figures 3 and 11. A dog 92 is arranged for movement into engagement with a cam stop projection 91 when the apparatus is tripped, as shown in Figure 11. The dog 92 is pivotally carried by a support crank 93, the latter of which is pivotally mounted at 94 on the base. A support crank 93 has a pin 95 against which the dog 92 is biased by a spring 96. A projection 97 on dog 92 will engage pin 95 under certain circumstances and limit the movement of the dog. The support crank 93 also carries an adjustable abutment 98, the latter of which is arranged to engage a projection 99 on a pull-link crank 100 which is also pivoted at 94.

Figure 12:
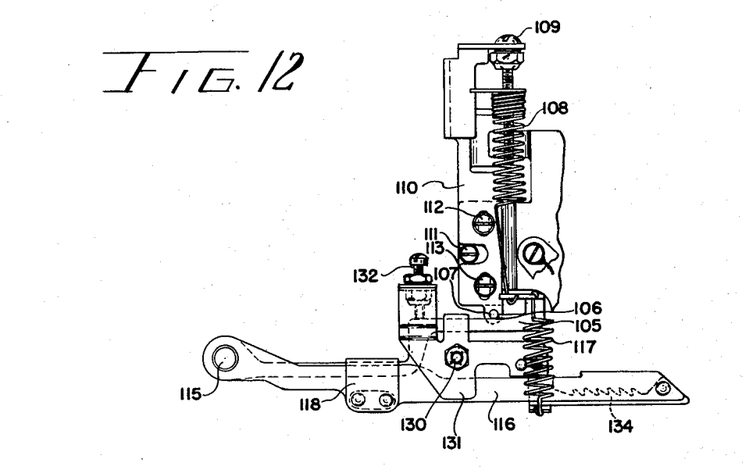
Figure 12 shows a portion of the tripping mechanism.
Figure 13:
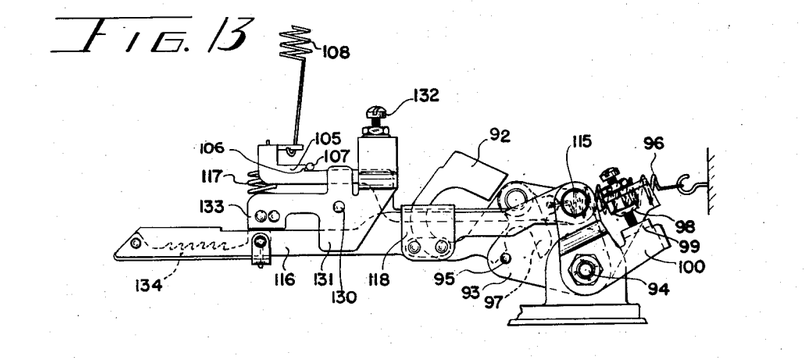
Figure 13 shows a view of the tripping mechanism taken from a side opposite the side shown in Figure 12.

The pull-link crank 100 is held in a counterclockwise direction, as viewed in Figure 13, against the biasing action of spring 96, acting through dog 92, support crank 93, abutment 98, and projection 99, by a latch arm 105 which has a notch 106 therein which engages a pin 107. The latch arm 105 is biased in an upward direction by a spring 108 which is adjustable by means of a threaded adjustment 109, shown best in Figure 12. The spring 108 and the adjustment 109 are carried by a plate 110 which also carries the pin 107, said pin being vertically adjustable by means of an eccentric screw assembly 111, also carried by plate 110 and fastened thereto by a pair of screws 112 and 113.

The end of latch arm 105 opposite that where the notch 106 is located is pivoted on the support crank 100 at 115. Also pivotally mounted on the support crank 100 and 115 is a relatching link 116 whose functioning will be discussed below. The relatching link 116 is biased in an upward direction by means of a spring 117 which interconnects latch arm 105 and the link 116. The relatching link 116 is actually a U-shaped channel member with the latch arm 105 mounted therein and extending therethrough from the pivot 115 until the arm passes under a saddle member 118 which covers the link 116 and arm 105. The saddle member 118 is positioned directly under the trip actuator 81, as shown in Figure 9.

It will be recalled that upon the release of the latch holding arm 80, the torque arm 52 acting through nose member 54 causes the latch 53 to rotate clockwise, as viewed in Figure 9. This clockwise movement of latch 53 causes a corresponding movement of the trip actuator 81 so that the actuator projection 82 which is a part thereof will bear down upon the saddle 118 on the relatching link 116. This downward movement of the saddle 118 will cause the link 116 and latch arm 105 to pivot about the pivot 115 and this pivoting will move the pin 107 out of the notch 106 on arm 105. With nothing holding the arm 105 in the position shown upon the drawing, the spring 96, shown in Figure 13, will be effective to rotate the support crank 93 in a clockwise direction and to pull the arm 105 and the link 116 to the right. As the support crank is pulled in a clockwise direction, the dog 92 is moved into engagement with the cam stop 90. As the torque arm collapses, the connecting links 44 and 45 will be broken at 43 and pulled downwardly and when so moving, the output arm 46 rotates in a counterclockwise direction, as viewed in Figure 3, and also rotates the stop 90 until the projection 91 strikes the dog 92. When the stop arm 90 strikes the dog 92, the apparatus will be in the position shown in Figure 11.

Figure 8:
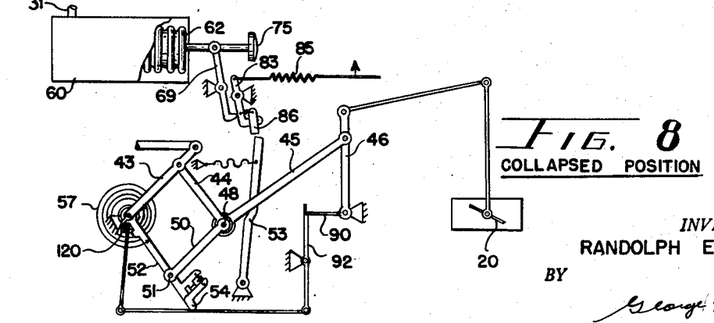

Reconsidering the above in the schematic showings of Figures 7 and 8, it will be noted that in Figure 7, the apparatus is in the closed gate position. Upon the release of the latch 53, the torque arm 52 rotates in a clockwise direction due to the force of the torque spring 57 and the links 44 and 45 will be broken. As the output arm 46 rotates in a counterclockwise direction, the cam stop 90 will move into engagement with the dog 92 and will latch the output arm in a predetermined fixed position which may be, for example, the position in which the waste gate 20 will cause the associated turbine to deliver a desired amount of driving energy for the compressor 13, shown in Figure 1. This driving of the compressor is such that there will be an operating pressure which will be safe as far as engine operation is concerned.

The collapsing operation just explained has assumed that the waste gate has been in the closed gate position or in a near closed gate position at the time of the collapse. Under normal circumstances, this is the only time that the linkage will be collapsed due to the operation of the bellows 62. However, in the event that the manual button 75 is depressed to effectively cause a collapsing of the apparatus, this manual button depressing can occur at any time or in any position of the apparatus. If the apparatus is in a position near the closed gate position as assumed above, the apparatus will move to the collapsed position which has been assumed above. In the event that the apparatus is in the near open gate position, and the manual button 75 is depressed, the apparatus will collapse, but in this case, the position to which the linkage will collapse will not be dependent upon the position of the cam stop 90. The reason that it will not be dependent upon the cam stop 90 will be understood from Figure 5 where it is noted that when the apparatus is in the open gate position, the cam stop 90 is below the dog 92 and any collapsing of the apparatus would not cause the stop 90 to engage the dog 92. What happens in this case is that the apparatus will collapse, with the torque arm 52 moving in a clockwise direction, until such time as the torque arm strikes an abutment 120 which is carried by the input arm 43. This abutment is shown in Figure 2, as well as in the schematic showings of Figures 5-8. There will be no movement of the input arm as the arm is connected to the waste gate motor through a gear train which acts as a brake. Also, the waste gate motor may have a brake therein.

For adjusting the relative position of the cam stop 90 with respect to the output arm 46, there is provided an adjustable template 121 having a plurality of offset screw holes therethrough with a screw 122 being placed in a desired screw hole to determine the relative positions between the arm and the stop. As the abutment 120 on the input arm 43 is rigidly attached thereto, the apparatus when tripped from a position wherein the stop 90 will not strike the dog 92, the linkage will always be collapsed to a position which will be dependent upon the position of the input arm 43 and will not be adjustable with respect thereto.

Next to be considered is the relatching mechanism which is effective to put the connecting linkage back to an operating position from the collapsed position. Referring first to Figures 12 and 13, there is shown pivoted at 130, a crank arm 131. This crank arm 131 has a bracket thereon carrying an adjustable screw member 132, the lower end of which engages the latch arm 105. When the pin 107 is in notch 106, the spring 108 pulls the arm 105 in an upward direction and this upward movement causes the arm to strike the screw 132 and rotate the crank arm 131 about the pivot 130. On the opposite side of the pivot 130 on arm 131 is a projection 133 which is arranged to strike the pull link 146 and force it downwardly against the biasing action of spring 117. This pull link has in the end thereof a rack 134, shown also in Figure 9. This rack, when the link is biased downwardly, as shown, is out of engagement with a ratchet gear 135. This ratchet gear is arranged to be driven by a sector gear 136 which is connected to the input arm 43.

Upon the trip actuator 81 forcing the arm 105 and link 116 downwardly, the arm 105 and link 116 will move to the right, as viewed in Figure 9, and the rack 134 will be maintained out of engagement with the ratchet gear 136 until the stop cam 91 strikes the dog 92. As soon as the nose member 54 has cleared the latch 53, the latch is free to rotate back to the position shown in the drawings and the pall 86, which is biased by spring 85, will force the holding arm 80 back into a holding position. When the latch 53 moves back, the trip actuator 81 will move back and the arm 105 and link 116 will move upwardly so that now the rack 134 carried by the link 116 will engage the ratchet gear 135.

To initiate the relatching movement, it is necessary to move the input arm 43 or the shaft 42 in a waste gate opening direction, or, as viewed in Figure 9, the sector gear 136 will be rotated in a counterclockwise direction by the input arm. The initial movement of this sector gear 136 will cause a corresponding rotation of the ratchet 135 and the rack 134 so that the rack 134 will move to the left and pull with it the pivot point 115. Referring now to Figure 11, where the relatching movement of the link 116 will cause movement of the pivot point 115 to the left, or counterclockwise direction. This movement to the left will cause the support crank 100 acting through projection 99 and the adjustable abutment 98 carried by the support crank 93 to rotate the support crank 93. As the torque spring 57 is acting with considerable force upon the linkage in the collapsed position, the cam stop 91 will be forced against the dog 92 with considerable force. In order to move the dog 92 away from this position, the support crank 93 in rotating counterclockwise will cause the pivot 137 which carries the dog 92 to move counterclockwise and to rotate the dog 92 about a point where the dog 92 engages the cam stop 91 so that in effect, the dog 92 will be rotating in a clockwise direction about a point on the cam stop. This rotative movement of the dog 92 effects an easy breaking away of the dog from the cam stop 91 and requires a minimum of breaking force.

As soon as the dog 92 is moved out from under the stop 91, the linkage will collapse even further. This additional collapsing will continue until the torque arm 52 strikes the abutment 120 which is carried by the input arm 43. This is best shown in the diagrammatic showing of Figures 5–8. Continued movement of the input arm 43 in a waste gate opening direction, or as viewed in the schematic showing of Figures 5–8, in a counterclockwise direction will cause the abutment 120 to act upon the torque arm 52 and will force the same in a counterclockwise direction. The linkage will continue to move back to its operating position and as soon as the nose member 54 carried by the torque arm 52 strikes the latch 53, the nose piece will rotate and allow the torque arm to move to the operating position. The torque arm will reach the operating position upon the input arm 43 being moved to the wide open gate position, as shown in Figure 5.

As soon as the apparatus has been rotated back to the near open gate position, the rack 134 will be forced out of engagement with the ratchet 135 by the operation of the crank arm 131 and the pin 107 moving into notch 106, as explained in connection with Figures 12 and 13. When the rack is moved out of engagement with the ratchet 135, the apparatus will be ready for another collapsing operation upon the occurrence of an excessive intake manifold pressure or upon actuation of the collapsing mechanism by the depressing of the manual button 75.

From the foregoing it will be understood there has been provided an improved collapsible linkage apparatus which will render inoperative a driving connection between a driven arm and a driving arm with the driven arm being forced into an inoperative position upon the collapse of the linkage. Further, there has been provided a resetting assembly which requires less resetting force than is exerted by the collapsing force of the apparatus upon the driving connection. Inasmuch as many modifications will be obvious to those skilled in the art, it is to be understood that the scope of the invention is to be limited solely by the appended claims.

I claim:

1. A controlling system, comprising in combination, a first shaft, said shaft having an input arm attached thereto, a second shaft, said second shaft having an output arm rigidly attached thereto, a collapsible linkage system comprising, a torque arm pivotally supported at one end thereof on said first shaft, a support, said support engaging the other end of said torque arm, an output connecting link pivotally mounted at one end thereof on one end of said output arm, a connecting link, said link being connected between said torque arm and said output connecting link, a crank connecting link connecting said linkage system and said input arm, and tripping means rendering said support ineffective so that said linkage system will collapse.

2. A controlling system, comprising, a first shaft, said shaft having an input arm attached thereto, a second shaft having an output arm attached thereto, a collapsible linkage system, comprising a torque arm pivotally supported at one end thereof on said first shaft, a driving link pivotally attached on one end thereof to said input arm, a torque arm connecting link connecting said torque arm and said driving link to form a parallelogram, mechanical means connecting said linkage system to said output arm, and support means to hold said linkage system.

3. A controlling system, comprising in combination, a first member, said member being pivotally supported at one end thereof, latch means, said latch means rigidly holding said first member, a second and third member each being pivotally connected to said first member, driving means, controlled means, a fourth member, means connecting said fourth to said second and said third member so that said members form a rectangular linkage system, and coupling means including said linkage system connecting said driving means in motion controlling relation to said controlled means.

4. A controlling system, comprising in combination, an electrical driving means, a linkage system having a first member, said member being pivotally supported at one end thereof and latched on said driving means in a rigid manner, and a second member being spaced adjacent and parallel to said first member and being pivotally connected to said first member by third and fourth members to form a parallelogram, a controlled device, and coupling means, said coupling means connecting said controlled device to said linkage system.

5. A device-positioning system comprising, an electrical driving motor, latching means, pressure controlling means, and a parallelogrammatical linkage system having a first member pivotally supported and latched in a rigid manner and a second member being spaced in a position adjacent and parallel to said first member by two cooperating members, and means including said linkage system for connecting said driving motor to said pressure controlling means and maintained in an operative position by said latching means.

6. A mechanical coupling linkage, comprising, a latch member, a latched member pivotally mounted at one end and supported at the other by said latch member, resilient means biasing said latched member against said latch member, a second member mounted parallel to said latched member by a pair of spacing members to form a parallelogram, an output member pivotally mounted on a plane corresponding to a plane extending along the length of said latched member when biased against said latch, a coupling link connected between said second member and said output member and movable parallel to said latched member when in latched position, and means for moving said latch member from its supporting position on said latched member so that said resilient means will rotate said latched member and said parallelogram to an inoperative position.

7. A linkage system between a driving member and an output member, a pair of connecting links pivotally connected together and pivotally attached to said driving member and said output member, a supporting member maintaining the pivotal connection between said connecting links in a position so that movement of said driving member will cause a corresponding movement of said output member, a torque arm resiliently biased for rotation, said torque arm being connected to said supporting member, latch means for maintaining said torque arm in a fixed position, and condition responsive means for releasing said latch so that said torque arm will rotate and reposition said supporting member to interrupt the driving relation between said connecting links.

8. A safety mechanism interconnecting a driving member and an output member, comprising a pair of connecting links pivotally connected together and pivotally attached to said driving member and said output member, a latch, a supporting member maintaining the pivotal connection between said connecting links in an operative position so that said driving member will cause a corresponding movement of said output member, resilient biasing means connected to bias said supporting member, said latch maintaining said supporting member and said connecting links in said operative position, means for releasing said latch means, said biasing means upon release of said latch means exerting a breaking force on said connecting link which is greater than the biasing force on said supporting member, and relatching means for moving said supporting member back to said operative position, said relatching means including said driving member and exerting a force upon said biasing means which is less than the initial breaking force on said connecting links.

9. A driving linkage, comprising, a pair of links pivotally connected in a position of near axial alignment, a relatively high breaking force exerted by biasing means tending to cause initial breaking of said axial alignment of said links acting at an angle to the longitudinal axis of said links, and means for latching said links to said position of near axial alignment following movement from said position, said means comprising a member exerting a force on said biasing means which is greater than the angular breaking force on said links when in said position.

10. A driving linkage, comprising, a driving arm, an output arm, a pair of links pivotally connected and in near axial alignment connected between said driving arm and said output arm, biasing means acting upon the point of connection of said links and exerting a relatively high breaking force tending to cause movement of said point of connection to displace said links from said position of near axial alignment, and means relatching said links to said position of axial alignment upon movement therefrom, said means comprising a member carried by said driving arm exerting a force on said biasing means which is less than the biasing force of said means upon said links when in said position of axial alignment.

11. A pressure controlling apparatus, comprising in combination, a load device to be positioned, electric motor means for driving said load device, said motor means having an output shaft, a linkage system connecting said motor means and said load device, said linkage system comprising a first member, said member being pivotally supported at one end thereof about said output shaft, a second member spaced adjacent and parallel to said first member and being connected to said first member by two interconnecting members forming a parallelogram linkage system, a latch means holding said first member in a predetermined position, pressure sensitive releasing means, means including said pressure sensitive releasing means for unlatching said latch means, a torque spring, said torque spring being connected to said first member so that upon a sensed pressure exceeding a predetermined value said latch means will become unlatched and said spring will render said linkage system ineffective.

12. Pressure sensitive apparatus, comprising in combination, a device to be driven, motor means for driving said device, said means having a shaft, a collapsible linkage system comprising a torque member pivotally supported at one end thereof on said shaft, said linkage system connecting said motor means and said device, latching means supporting said linkage system at the opposite end of said torque member, a torque spring, a spring providing a biasing force on said torque member in a first rotational direction about said shaft, pressure responsive tripping means, said means being actuated by a pressure sensitive bellows and causing said latching means to be ineffective, and relatching means for overcoming said torque spring, said relatching means causing rotation of said torque arm in a second rotational direction about said shaft.

13. A safety mechanism, comprising in combination, a driving arm member, said arm member being pivotally supported at one end thereof, a load arm member, said load arm member being pivotally supported at one end thereof, a pair of connecting link members connecting said load arm member and said driving arm member, said connecting link members, said driving arm member and said load arm member forming a collapsible parallelogram, and latch means, said latch means supporting one of said connecting members of said parallelogram so that on pivotal operation of said driving arm member said one connecting member remains stationary.

14. A controlling system, comprising in combination, controlled means, a collapsible parallelogram linkage means comprising a plurality of pivotally connected link members, a base, mechanical latch means, said mechanical latch means being attached to said base and supporting one member of said parallelogram linkage means to thereby restrain the operation of the other link members, driving means, said driving means being connected to said controlled means by said parallelogram linkage means, and pressure responsive trip means for tripping said latch means, said tripping means rendering said parallelogram linkage means ineffective by the removal of the latch means from support of said one member.

References Cited in the file of this patent

UNITED STATES PATENTS

| | | |
|---|---|---|
| 497,871 | Floyd | May 23, 1893 |
| 2,218,606 | Foster | Oct. 22, 1940 |
| 2,486,369 | Goss | Oct. 25, 1949 |
| 2,558,514 | De Jarlais et al. | June 26, 1951 |
| 2,561,618 | Foster | July 24, 1951 |